(12) United States Patent
Diamant et al.

(10) Patent No.: US 10,990,408 B1
(45) Date of Patent: Apr. 27, 2021

(54) PLACE AND ROUTE AWARE DATA PIPELINING

(71) Applicant: Amazon Technologies, Inc., Seattle, WA (US)

(72) Inventors: Ron Diamant, Santa Clara, CA (US); Akshay Balasubramanian, Austin, TX (US); Sundeep Amirineni, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 16/582,573

(22) Filed: Sep. 25, 2019

(51) Int. Cl.
  *G06F 17/50* (2006.01)
  *G06F 9/38* (2018.01)
  *G06F 9/30* (2018.01)
  *G06F 9/54* (2006.01)
  *G06F 9/50* (2006.01)

(52) U.S. Cl.
  CPC ........ *G06F 9/3869* (2013.01); *G06F 9/30098* (2013.01); *G06F 9/3877* (2013.01); *G06F 9/5077* (2013.01); *G06F 9/544* (2013.01)

(58) Field of Classification Search
  USPC ........ 716/105, 108, 111, 106, 113, 114, 131, 716/134
  See application file for complete search history.

(56) References Cited

U.S. PATENT DOCUMENTS

| | | | | |
|---|---|---|---|---|
| 5,333,032 | A * | 7/1994 | Matsumoto | G06F 30/327 716/102 |
| 6,336,205 | B1 * | 1/2002 | Kurokawa | G06F 30/327 716/113 |
| 10,417,374 | B1 * | 9/2019 | Iyer | G06F 30/327 |
| 2006/0015547 | A1 * | 1/2006 | Kuszmaul | G06F 9/3844 708/200 |

* cited by examiner

*Primary Examiner* — Brian Ngo
(74) *Attorney, Agent, or Firm* — Kilpatrick Townsend & Stockton LLP

(57) ABSTRACT

Methods for place-and-route aware data pipelining for an integrated circuit device are provided. In large integrated circuits, the physical distance a data signal must travel between a signal source in a master circuit block partition and a signal destination in a servant circuit block partition can exceed the distance the signal can travel in a single clock cycle. To maintain timing requirements of the integrated circuit, a longest physical distance and signal delay for a datapath between master and servant circuit block partitions can be determined and pipelining registers added. Datapaths of master circuit block partitions further away from the servant circuit block can have more pipelining registers added within the master circuit block than datapaths of master circuit block partitions that are closer to the servant circuit block.

20 Claims, 9 Drawing Sheets

500

510 — DETERMINE PROPAGATION DELAY FOR LONGEST DATAPATH IN A FIRST SET OF DATAPATHS BETWEEN A FIRST MASTER CIRCUIT BLOCK AND A SERVANT CIRCUIT BLOCK

520 — DETERMINE A FIRST NUMBER OF REGISTERS TO BE ADDED TO THE LONGEST DATA PATH OF THE FIRST SET OF DATAPATHS

530 — ADD THE FIRST NUMBER OF REGISTERS TO EACH OF THE FIRST SET OF DATAPATHS

540 — DETERMINE PROPAGATION DELAY FOR LONGEST DATAPATH IN A SECOND SET OF DATAPATHS BETWEEN A SECOND MASTER CIRCUIT BLOCK AND THE SERVANT CIRCUIT BLOCK

550 — DETERMINE A SECOND NUMBER OF REGISTERS TO BE ADDED TO THE LONGEST DATA PATH OF THE SECOND SET OF DATAPATHS

560 — ADD THE SECOND NUMBER OF REGISTERS TO EACH OF THE SECOND SET OF DATAPATHS

FIG. 5

PLACE AND ROUTE AWARE DATA PIPELINING

BACKGROUND

Integrated circuit devices can be characterized by the clock frequency at which they operate. In a synchronous digital integrated circuit device, data moves in lockstep, advancing one stage during each clock cycle. Synchronization is achieved by using elements such as flip-flops or registers, which copy their input to their output in response to the clock signal. In large integrated circuits, the physical distance a data signal must travel between a signal source and a signal destination can, in some cases, exceed the distance the signal can travel in a single clock cycle.

BRIEF DESCRIPTION OF THE DRAWINGS

Various embodiments in accordance with the present disclosure will be described with reference to the drawings, in which:

FIG. 5 is a flowchart illustrating an example of a method for place and route aware pipelining according to aspects of the present disclosure;

DETAILED DESCRIPTION

Figure 1A:
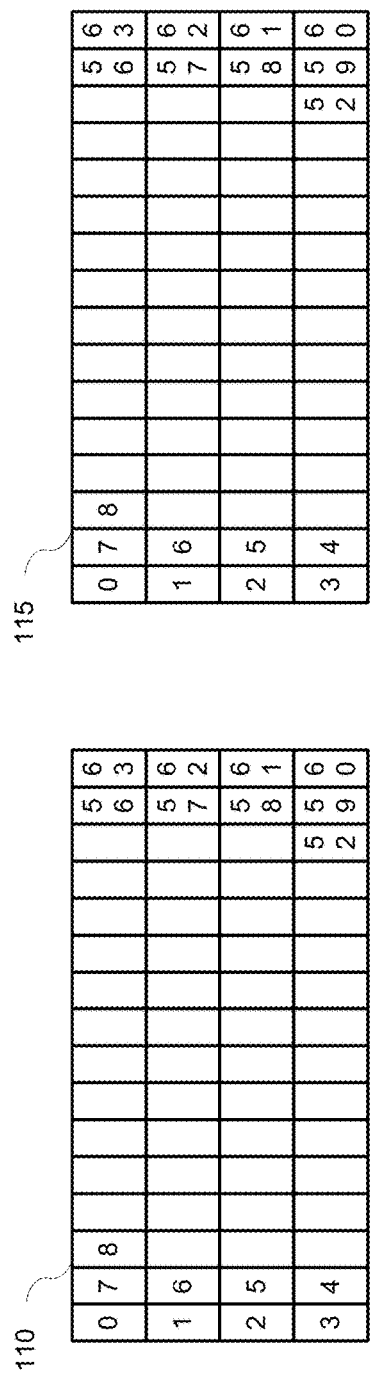
FIG. 1A is a simplified diagram of an example of partitions for a master circuit block and a servant circuit block according to aspects of the present disclosure.

An integrated circuit device can include various master and servant circuit blocks. The master circuit blocks can be execution engines, and the servant circuit blocks can be storage buffers. Each of the execution engines and storage buffers may include processing logic for processing instructions and data, and storage areas, referred to herein as data storage blocks, that data can be written to and read from. Examples of execution engines may be the processing element array, the activation engine, and the pooling engine as described with respect to FIG. 6. Examples of storage buffers may be the memory subsystem and the results buffer as described with respect to FIG. 6.

The processing logic and/or data storage blocks may be divided into hardware partitions occupying physical areas on a die and configured to process data in parallel with other partitions. Each partition within a circuit block can be identical to the other partitions, and may have the same circuit components and be capable of performing the same functions. Requests to read or write data may be generated by an execution engine (e.g., a master circuit block) to a storage buffer (e.g., a servant circuit block). In response to a request, data may be transferred over a physical datapath between corresponding partitions of the master circuit block and the servant circuit block. For example, in response to a write request, the master circuit block may transmit data from partition_0 of its data storage block over a physical path to partition_0 of the storage block in the servant circuit block.

The timing requirements (e.g., a clock timing parameter) for a synchronous integrated circuit device may necessitate that data transmitted from one element, for example a flip-flop, must be received by another element (e.g., another flip-flop) within one clock cycle of the integrated circuit device. In some case, the physical distance the data signal must travel between a signal source (e.g., a partition in the master circuit block) and a signal destination (e.g., a partition in the servant circuit block) can exceed the physical distance the signal can travel in a single clock cycle.

Pipelining can be used to maintain the timing requirements of the integrated circuit device. One solution to this problem is to calculate the longest physical signal path (e.g., the worst-case distance or propagation delay) within a circuit block (e.g., master circuit block, or servant circuit block) and determine a number of pipeline registers to be inserted in the signal path within the circuit block such that during each clock cycle, data transmitted from the partition in the circuit block will be received and retransmitted by a pipeline register each clock cycle until the data is outputted to the downstream circuit block. The determined number of pipeline registers may then be inserted in the signal path for every partition in the circuit block. A pipeline register may accommodate one bit of a data word. Thus, for a 16-bit data word, a 16-bit pipeline register may be used at each insertion point.

While this solution can maintain the timing requirements of the integrated circuit device by transmitting and receiving data within one clock cycle by the pipeline registers inserted within a circuit block, it may not be an optimum solution. Inserting a worst-case number of pipeline registers within a circuit block may result in excessive delay in many cases. For example, a master circuit block that transfers data with a servant circuit block may have a worst-case propagation delay that requires 4 pipeline registers, and the servant circuit block may similarly have a worst-case propagation delay that requires 6 pipeline registers. Using the solution described above, 4 pipeline registers will be inserted in each partition of the master circuit block, and 6 pipeline registers will be inserted in each partition of the servant circuit block for a total of 10 pipeline registers per master-to-servant partition pair. However, when considering the entire datapath from a master partition to a servant partition based on the layout and placement of the partitions and the circuit blocks, the worst case propagation delay may only require 8 pipeline registers. Thus, to meet the timing requirements for worst-case propagation delay within a circuit block, the solution adds unnecessary delay to some signal paths, and requires a large number of pipeline registers that use up die area, consume power, and add to layout congestion.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1B:
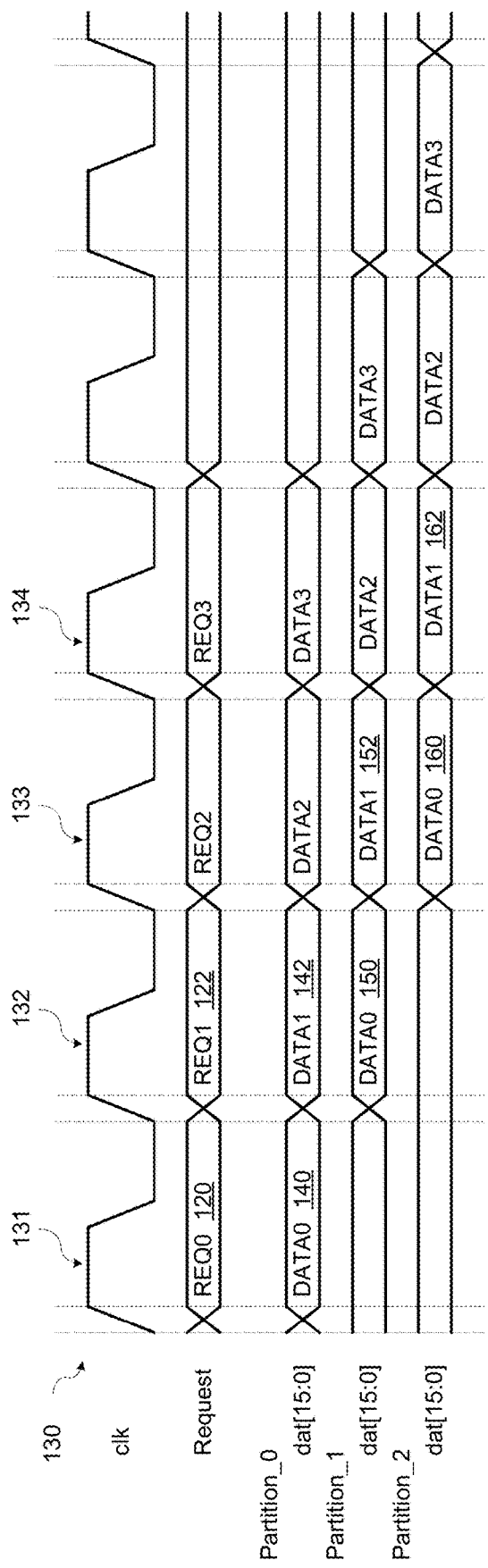
FIG. 1B is a timing diagram illustrating data transfer between the partitions for the master circuit block and the servant circuit block of FIG. 1A according to aspects of the present disclosure.

Aspects of the present disclosure provide a place and route aware data pipelining method that can reduce the number of logic devices (e.g., flip-flops) used on an integrated circuit device for pipelining, thereby reducing area used on a die, power consumption, and layout congestion. FIG. 1A is a simplified diagram of an example of partitions for a master circuit block and a servant circuit block according to aspects of the present disclosure. FIG. 1B is a timing diagram illustrating data transfer between the storage block partitions for the master circuit block and the servant circuit block of FIG. 1A according to aspects of the present disclosure.

Referring to FIGS. 1A and 1B, the master circuit block 110 and the servant circuit block 115 may each include 64 partitions (i.e., partition_0 through partition_63). The master circuit block 110 may transmit a first request 120, for example a read request, to partition_0 of the servant circuit block 115 during a first clock cycle 131 of the clock signal 130. When the first request 120 is sent to partition_0 of the servant circuit block 115, the first request operates to cause the servant circuit block 115 to transmit data from all the partitions of the servant circuit block 115 to the master circuit block 110. The data 140 transmitted for partition_0 may be transmitted in the same clock cycle as the request, and data transmitted for the other partitions (i.e., partitions 1-63) will be staggered, meaning the data for partition_1 will be one clock cycle delayed than the data for partition_0 and so on. For example, the data 150 for partition_1 may be transmitted during the second clock cycle 132, the data 160 for partition_2 may be transmitted during the third clock cycle 133, etc. The transmitted data may be stored in the corresponding partitions of the master circuit block 110.

As additional requests are transmitted to partition_0 of the servant circuit block 115 during subsequent clock cycles, data will continue to be transmitted in a staggered fashion from the partitions of the servant circuit block 115 to the corresponding partitions of the master circuit block 110. For example, as shown in FIG. 1B, a second read request 122 to partition_0 of the servant circuit block 115 may be transmitted from the master circuit block 110, and data 142 received from partition_0 of the servant circuit block 115 during the second clock cycle 132. Data 152 received from partition_1 will be transmitted during the third clock cycle 133, data 162 received from partition_2 will be transmitted during the fourth cycle 134, and so on for all of the partitions.

In order to meet the staggered timing requirements for transferring the data, the data signals should be transmitted and received in one clock cycle. However, in some cases, corresponding partitions in the master circuit block and servant circuit block may be physically further apart than the data signal can travel during one clock cycle. In such cases, pipelining registers can be added to the datapaths of the master circuit block and the servant circuit block to maintain the timing requirements using the data pipelining method of the present disclosure.

Figure 2:
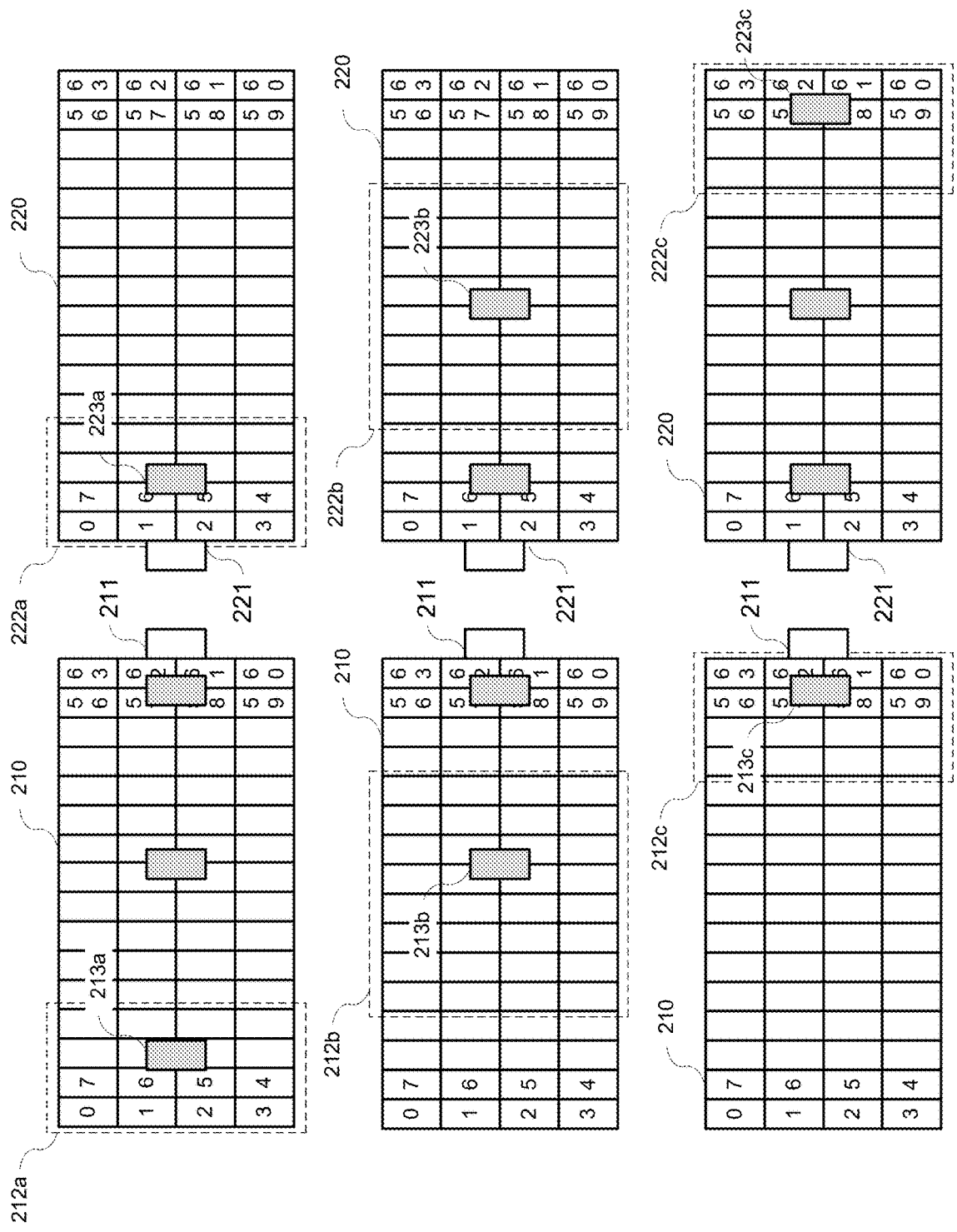
FIG. 2 is a diagram illustrating an example of pipelining register placement in a master circuit block and a servant circuit block according to aspects of the present disclosure.

FIG. 2 is a diagram illustrating an example of pipelining register placement in a master circuit block and a servant circuit block according to aspects of the present disclosure. Referring to FIG. 2, a master circuit block 210 and a servant circuit block 220 are each arranged in a two-dimensional array of 64 partitions. In some implementations, the partitions may be arranged in a one-dimensional array, or the circuits blocks can be arranged in other form factor or in other shapes. Data connection points 211, 221 may be structures, for example, interface structures or other structures, for permitting ingress/egress of data for a master circuit block 210 and a servant circuit block 220, respectively.

Pipelining register placement may take into account the physical location of the partitions. The physical distance between corresponding master and servant partitions, and a number of clock cycles for data from a master partition to traverse the area of the circuit blocks to a corresponding servant partition may be calculated. Within each circuit block, groups of partitions may be formed based on a determined number of clock cycles needed for data in a partition to be transmitted across the area occupied by the circuit block to the data connection point 211. For example, a first group of partitions 212a may be formed in the master circuit block 210 based on determining that data from each partition in the group will be transmitted across the area of the circuit block to the data connection point 211 in the same number of clock cycles.

A first pipelining register 213a may be placed within the first group of partitions 212a. Similarly, a second group of partitions 212b may be formed based on determining that data from each partition in the second group of partitions 212b will be transmitted across the area of the circuit block to the data connection point 211 in the same number of clock cycles. Finally, a third group of partitions 212c may be formed based on determining that data from each partition in the third group of partitions 212c will be transmitted across the area of the storage block to the data connection point 211 in the same number of clock cycles. Second and third pipelining registers 213b, 213c may be placed within the second and third groups of partitions 212b, 212c, respectively.

Each of the partitions in the first group of partitions 212a of the master circuit block 210 may require one clock cycle to transmit data to the first pipelining register 213a, one clock cycle to transmit the data from first pipelining register 213a to the second pipelining register 213b, one clock cycle to transmit the data from the second pipelining register 213b to the third pipelining register 213c, and one more clock cycle to transmit the data from the third pipelining register 213c out of the master circuit block 210 via the data connection point 211, for example to the servant circuit block 220. Thus, four clock cycles may be used to transmit data from the first group of partitions 212a of the master circuit block 210 across the physical area of the storage block to the data connection point 211.

Each of the partitions in the second group of partitions 212b of the master circuit block 210 may require one clock cycle to transmit data to the second pipelining register 213b, one clock cycle to transmit the data from second pipelining register 213b to the third pipelining register 213c, and one more clock cycle to transmit the data from the third pipelining register 213c out of the master circuit block 210 via the data connection point 211, for example to the servant circuit block 220. Thus, three clock cycles may be used to transmit data from the second group of partitions 212b of the master circuit block 210 across the physical area of the circuit block to the data connection point 211.

Each of the partitions in the third group of partitions 212c of the master circuit block 210 may require one clock cycle to transmit data to the third pipelining register 213c, and one more clock cycle to transmit the data from the third pipelining register 213c out of the master circuit block 210 via the data connection point 211, for example to the servant circuit block 220. Thus, two clock cycles may be used to transmit data from the second group of partitions 212b of the master circuit block 210 across the physical area of the circuit block to the data connection point 211.

Corresponding partition groups may be formed in the servant circuit block 220 based on a determined number of clock cycles needed for data in a partition to be transmitted across the area occupied by the circuit block to the data connection point 221 in the same number of clock cycles. For example, the fourth partition group 222a in the servant circuit block 220 may correspond to the first partition group 212a in the master circuit block 210. Similarly, the fifth and sixth partition groups 222b, 222c in the servant circuit block 220 may correspond to the second and third partition groups 212b, 212c, respectively, of the master circuit block 210. Fourth, fifth, and sixth pipelining registers 223a, 223b, 223c may be placed within the fourth, fifth, and sixth groups of partitions 222a, 222b, 222c, respectively.

Each servant circuit block may exchange data with more than one master circuit block. Thus, each pipelining register may include a plurality of pipelining registers, with each of the plurality of pipelining registers communicating with one master circuit block to maintain independent datapaths. In other words, the pipelining registers can be added independently for each master circuit block that may communicate with a servant circuit block.

Figure 3:
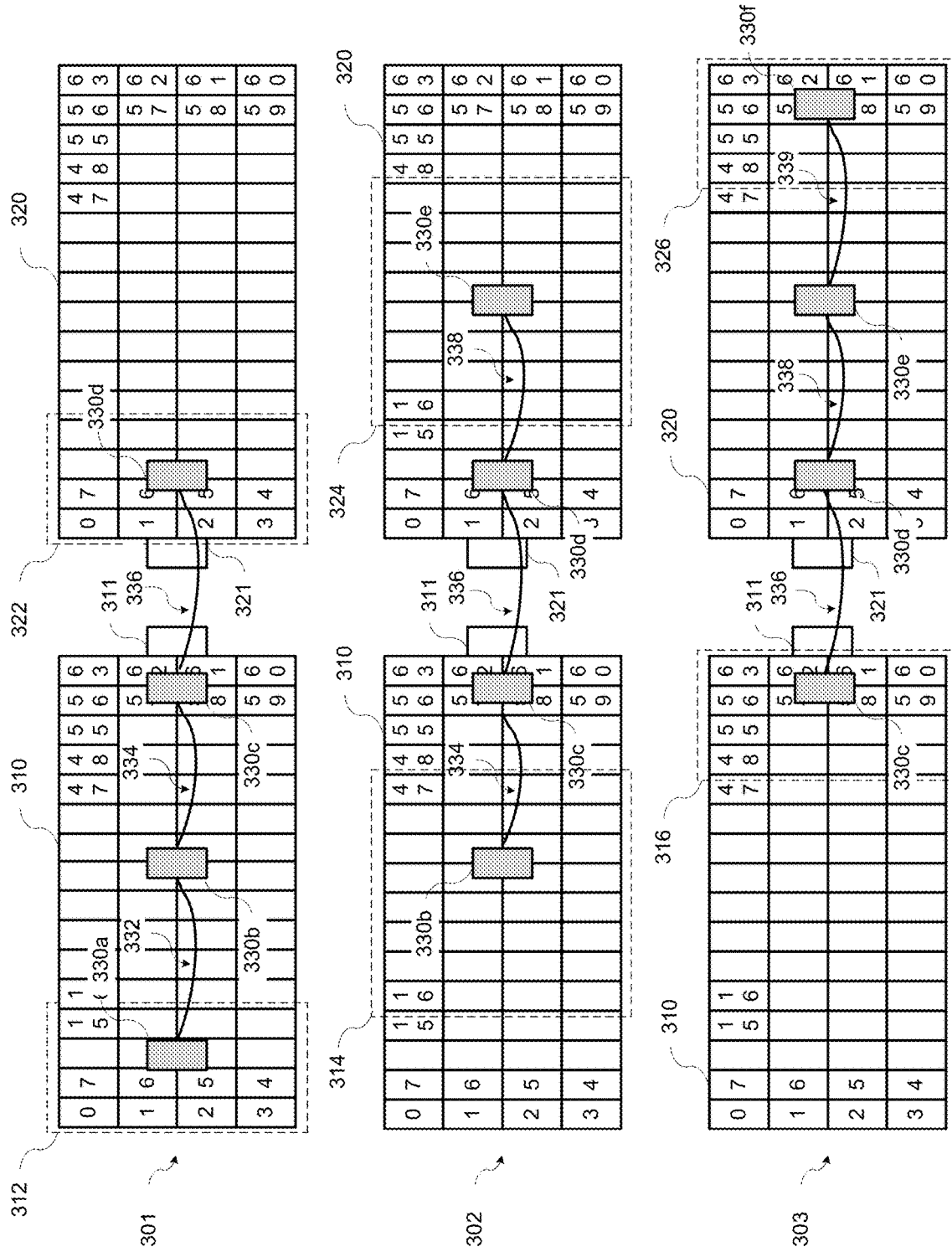
FIG. 3 is a diagram illustrating examples of data transmission sequences from a partition of a master circuit block to a partition of a servant circuit block according to aspects of the present disclosure.

FIG. 3 is a diagram illustrating examples of data transmission sequences from a partition of a master circuit block to a partition of a servant circuit block according to aspects of the present disclosure. Data connection points 311, 321 may be structures, for example interface structures or other structures, for permitting ingress/egress of data for the partition of a master circuit block 310 and the partition of a servant circuit block 320, respectively. As illustrated in FIG. 3, data is transmitted from a partition in a partition group of the master circuit block 310 to a corresponding partition in a partition group of the servant circuit block 320. Referring to the first data transmission sequence 301, data may be transmitted from a partition in the first partition group 312 of the master circuit block 310 to a partition in the first partition group 322 of the servant circuit block 320. Data may be transmitted from, for example partition_3, in the first partition group 312 to the first pipelining register 330a in a first clock cycle. The data may be transmitted 332 from the first pipelining register 330a to the second pipelining register 330b in a second clock cycle, and transmitted 334 from the second pipelining register 330b to the third pipelining register 330c in a third clock cycle. In a fourth clock cycle, the data may be transmitted 336 out of the master circuit block 310 from the third pipelining register 330c via the data connection point 311 to the fourth pipelining register 330d in the servant circuit block 320 via the data connection point 321. In a fifth clock cycle, the data may be transmitted from the fourth pipelining register 330d to the corresponding partition (i.e., partition_3) in the first partition group 322 of the servant circuit block 320.

Referring to the second data transmission sequence 302, data may be transmitted from a partition in the second partition group 314 of the master circuit block 310 to a partition in the second partition group 324 of the servant circuit block 320. Data may be transmitted from a partition, for example partition_16, in the second partition group 314 to the second pipelining register 330b in a first clock cycle. The data may be transmitted 334 from the second pipelining register 330b to the third pipelining register 330c in a second clock cycle. In a third clock cycle, the data may be transmitted 336 out of the master circuit block 310 via the data connection point 311 to the fourth pipelining register 330d in the storage block of the servant circuit block 320 via the data connection point 321. In a fourth clock cycle, the data may be transmitted 338 from the fourth pipelining register 330d to the fifth pipelining register 330e, and in a fifth clock cycle the data may be transmitted from the fifth pipelining register 330e to the corresponding partition (i.e., partition_16) in the second partition group 324 of the servant circuit block 320.

Referring to the third data transmission sequence 303, data may be transmitted from a partition in the third partition group 316 of the master circuit block 310 to a partition in the third partition group 326 of the servant circuit block 320. Data may be transmitted from a partition, for example partition_56, in the third partition group 316 to the third pipelining register 330c in a first clock cycle. In a second clock cycle, the data may be transmitted 336 out of the master circuit block 310 via the data connection point 311 to the fourth pipelining register 330d in the servant circuit block 320 via the data connection point 321. In a third clock cycle, the data may be transmitted 338 from the fourth pipelining register 330d to the fifth pipelining register 330e, and in a fourth clock cycle the data may be transmitted 339 from the fifth pipelining register 330e to the sixth pipelining register 330f. In a fifth clock cycle, the data may be transmitted from the sixth pipelining register 330f to the corresponding partition (i.e., partition_56) in the third partition group 326 of the servant circuit block 320.

As shown in the first data transmission sequence 301 of FIG. 3, the data coming from any of partitions 0-15 is pipelined three times inside the storage block of the master circuit block 310 and only once in the storage block of the servant circuit block 320. As shown in second data transmission sequence 302, the data coming from any of partitions 16-47 is pipelined two times in the master circuit block 310 and two times in the servant circuit block 320. As shown in the third data transmission sequence 303, the data coming from any of partitions 48-63 is pipelined once in the master circuit block 310 and three times in the servant circuit block 320. Thus, the total number of pipeline stages is equal for all partitions from the master circuit block 310 to the servant circuit block 320, and therefore the timing requirements, i.e., the staggering between data going to different partitions, is maintained.

It should be appreciated that the number of pipelining registers is merely exemplary and then another number of pipelining registers may be used without departing from the scope of the present disclosure. Similarly, the number of partitions in a storage block, the number of partition groups, and the number of partitions contained in a partition group is also exemplary and may depend on the physical size and arrangement of the partitions in the storage blocks. Thus, other numbers of partitions, partition groups, and partitions contained within the groups may be used without departing from the scope of the present disclosure.

In some implementations, more than one master circuit block (e.g., execution engine) may transfer data with a servant circuit block (e.g., storage buffer). To accommodate data transfers with multiple master circuit blocks, each partition group of a servant circuit block can include multiple pipelining registers such that one pipelining register is associated with each master circuit block that can communicate a servant circuit block, and arbitration logic to determine the order or priority in which each master can transfer data in case of a conflict. In some cases, a master circuit block may be a servant circuit block for another master circuit block and the partition groups may include multiple pipelining registers and arbitration logic.

Figure 4:
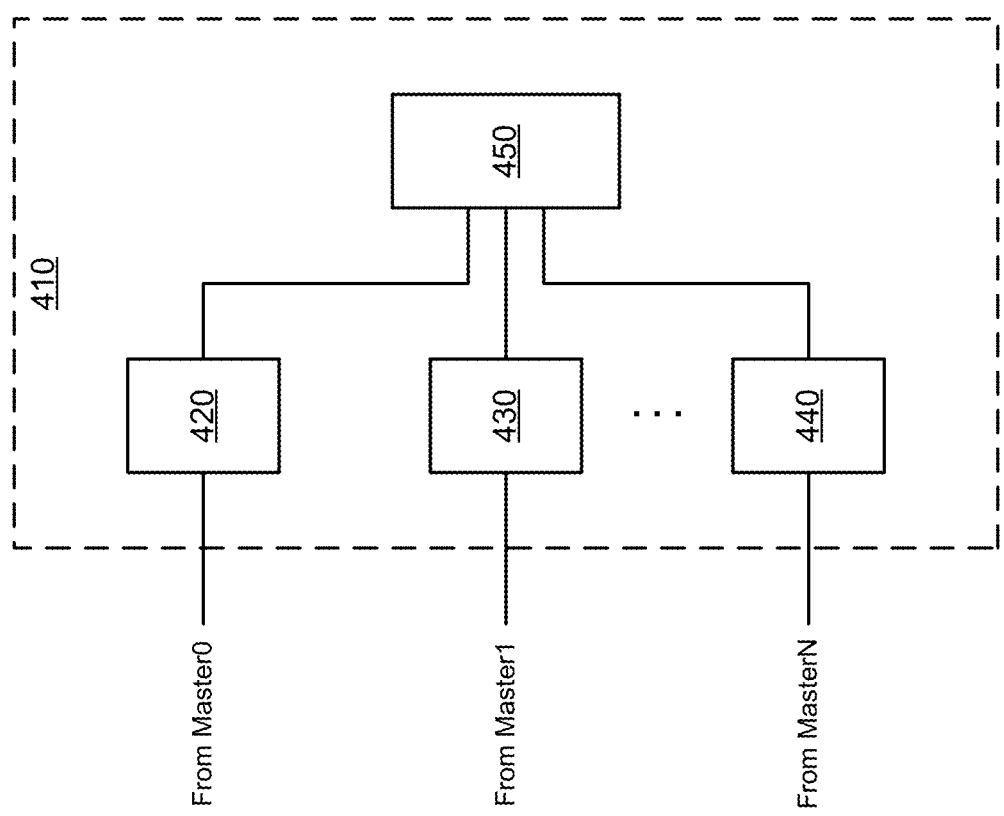
FIG. 4 is a simplified block diagram illustrating an example of having multiple master circuit blocks and arbitration logic according to aspects of the present disclosure.

FIG. 4 is a simplified block diagram illustrating an example of a partition group having multiple pipelining registers and arbitration logic according to aspects of the present disclosure. Referring to FIG. 4, a partition group 410 may be a partition group for a master circuit block or a servant circuit block. The partition group 410 may include multiple pipelining registers 420, 430, 440. Each of the multiple pipelining registers 420, 430, 440 may receive data from a different master circuit block and provide an individual data path for each master circuit block. The pipelining registers 420, 430, 440 may communicate with arbitration logic 450. The individual data paths may be merged and arbitrated by the arbitration logic 450 to transfer data with the same servant circuit block. In case of a conflict (e.g., more than one master attempting to transmit data to the partition group at the same time), the arbitration logic 450 can implement an arbitration scheme, for example, a round-robin algorithm, an age-based scheme, or another arbitration scheme, to determine the order in which the data from the master circuit blocks will be received by the partition group in the servant circuit block.

In accordance with aspects of the present disclosure, the number and initial placement of the pipelining registers may be determined by a place-and-route tool after the configuration of the storage block partitions for the master and servant circuit blocks (e.g., execution engines and storage buffers) are determined and placed on the integrated circuit device layout. The place-and-route tool may then calculate the physical distance between corresponding partitions across the areas of circuit blocks along the datapath (e.g., from left to right in the examples of FIGS. 2 and 3) and calculate a number of clock cycles for data from each partition to traverse the area of the circuit block. Based on the calculated distances and clock cycles, the place-and-route tool may form partition groups. The partition groups may be formed based on a determined number of clock cycles needed for data in a partition to be transmitted across the area occupied by the storage block. Partitions that can transmit data across the area occupied by the circuit block in the same number of clock cycles may be included in a same partition group.

The place-and-route tool may determine the number of pipelining registers to add based on the number of partition groups. The place-and-route tool may add one pipelining register to each partition group for each datapath. Each pipelining register can include separate registers to accommodate each master circuit block that can transmit data to the partition group as well as arbitration logic to handle reception of conflicting data transmissions to the partition group. In some cases, for example when the physical distance between a pipelining register at an exit point of the storage block of a master circuit block and a pipelining register at an entry point of the storage block of a servant circuit block is greater than the distance a data signal can travel in one clock cycle, one or more additional pipelining registers may be inserted by the place-and-route tool.

The output of the place-and-route tool, including the added pipelining registers, may be used to simulate the circuitry of the integrated circuit device, for example with Register Transfer Level (RTL) simulation to verify correct operation, including meeting the timing requirements, for example, the staggered data transfers between master and servant circuit blocks. After successful simulation, final physical placement of the pipelining registers may be performed using electronic design automation (EDA), manual physical placement, or a combination of electronic design automation (EDA) and manual physical placement. The integrated circuit device having the pipelining registers as determined by embodiments of the present disclosure may then be fabricated.

FIG. 5 is a flowchart illustrating an example of a method 500 for place-and-route aware pipelining according to aspects of the present disclosure. These methods may be implemented by the place-and-route tool described above for integrated circuit devices, such as for example the integrated circuit device described with respect to FIG. 6 as well as other integrated circuit devices.

At block 510, a propagation delay for a longest datapath in a first set of datapaths between a first master circuit block and a servant circuit block may be determined. The first master circuit block and a servant circuit block may be placed on the integrated circuit device layout. The place-and-route tool may calculate a number of clock cycles for data to be transmitted on datapaths between corresponding partitions of the first master circuit block and the servant circuit block.

At block 520, a first number of registers to be added to the longest data path of the first set of datapaths may be determined. Based on the number of clock cycles calculated for the longest datapath delay of the first set of datapaths, the place-and-route tool may determine that the first number of registers to add should be one register for each clock cycle of delay.

At block 530, the first number of registers may be added to each datapath in the first set of datapaths. Adding the first number of registers to each datapath in the first set of datapaths can result in a same number of clock cycles to transfer data between the first master circuit block and the servant circuit block.

At block 540, a propagation delay for a longest datapath in a second set of datapaths between a second master circuit block and the servant circuit block may be determined. The second master circuit block may be placed on the integrated circuit device layout. The place-and-route tool may calculate a number of clock cycles for data to be transmitted on datapaths between corresponding partitions of the second master circuit block and the servant circuit block.

At block 550, a second number of registers to be added to the longest data path of the second set of datapaths may be determined. Based on the number of clock cycles calculated for the longest datapath delay of the second set of datapaths, the place-and-route tool may determine that the second number of registers to add should be one register for each clock cycle of delay.

At block 560, the first number of registers may be added to each datapath in the first set of datapaths. Adding the second number of registers to each datapath in the second set of datapaths can result in a same number of clock cycles to transfer data between the second master circuit block and the servant circuit block. The servant partition may include arbitration logic configured to arbitrate access to the servant partition from the first master circuit block and the second master circuit block.

The output of the place-and-route tool, including the added pipelining registers, may be used to simulate the circuitry of the integrated circuit device, for example with Register Transfer Level (RTL) simulation to verify correct operation, including meeting the timing requirements, for example, the staggered data transfers between master and servant circuit blocks. Final physical placement of the pipelining registers may be performed. After successful simulation and verification, final physical placement of the pipelining registers may be performed. The final physical placement may be performed using electronic design automation (EDA), manual physical placement, or a combination thereof. After final physical placement, the integrated circuit device having the pipelining registers as determined by the method of FIG. 5 may be fabricated.

It should be appreciated that the specific operations illustrated in FIG. 5 provide a particular method for place-and-route aware pipelining according to an embodiment of the present disclosure. Other sequences of operations may also be performed according to alternative embodiments. For example, alternative embodiments may perform the operations outlined above in a different order. Moreover, the individual operations illustrated in FIG. 5 may include multiple sub-operations that may be performed in various sequences as appropriate to the individual step. Furthermore, additional operations may be added or removed depending on the particular applications. Other variations, modifications, and alternatives may be employed without departing from the scope of the present disclosure.

Figure 6:
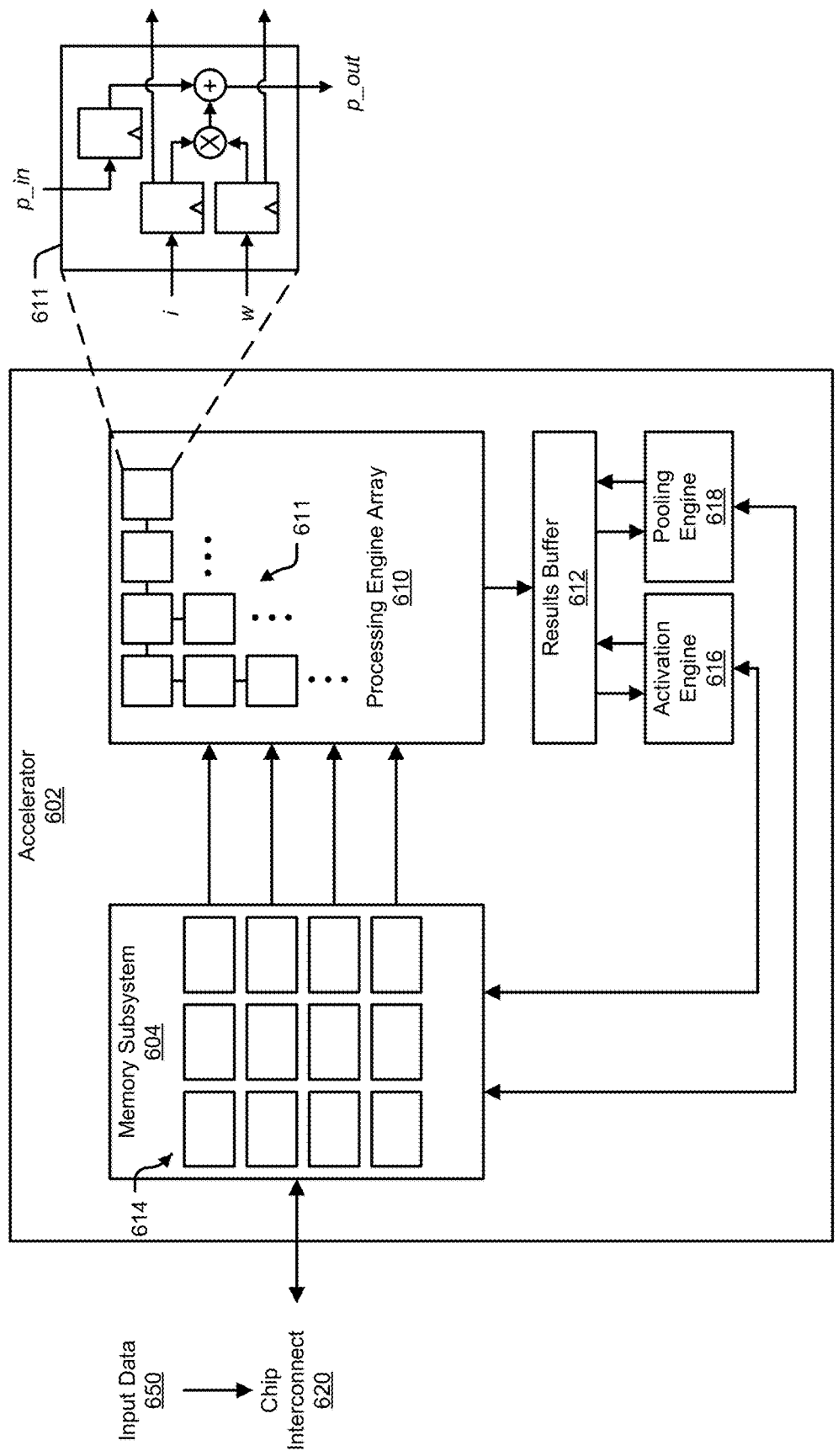
FIG. 6 is a block diagram illustrating an example of an integrated circuit device.

FIG. 6 is a block diagram illustrating an example of an integrated circuit device for which place-and-route aware pipelining according to the present disclosure can be implemented. The example of FIG. 6 illustrates an accelerator 602. In various examples, the accelerator 602, for a set of input data (e.g., input data 650), can execute computations using a processing engine array 610, an activation engine 616, and/or a pooling engine 618. In some examples, the example accelerator 602 may be an integrated circuit component of a processor, such as a neural network processor. The processor may have other integrated circuit components, including additional accelerator engines.

In various implementations, the memory subsystem 604 can include multiple memory banks 614. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the pooling engine 618, and any external clients that access the memory subsystem 604 over a communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616 and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hard wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 428 rows, or some other number of columns and rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, pin, provided either from another processing engine 611 or from a previous round of computation by the processing engine array 610. When starting a computation for a new set of input data, the top row of the processing engine array 610 can receive a fixed value for p in, such as zero. As illustrated by this example, i and w are multiplied together and the result is summed with pin to produce a new partial sum, pout, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

Herein, the activation engine 616 and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616 and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
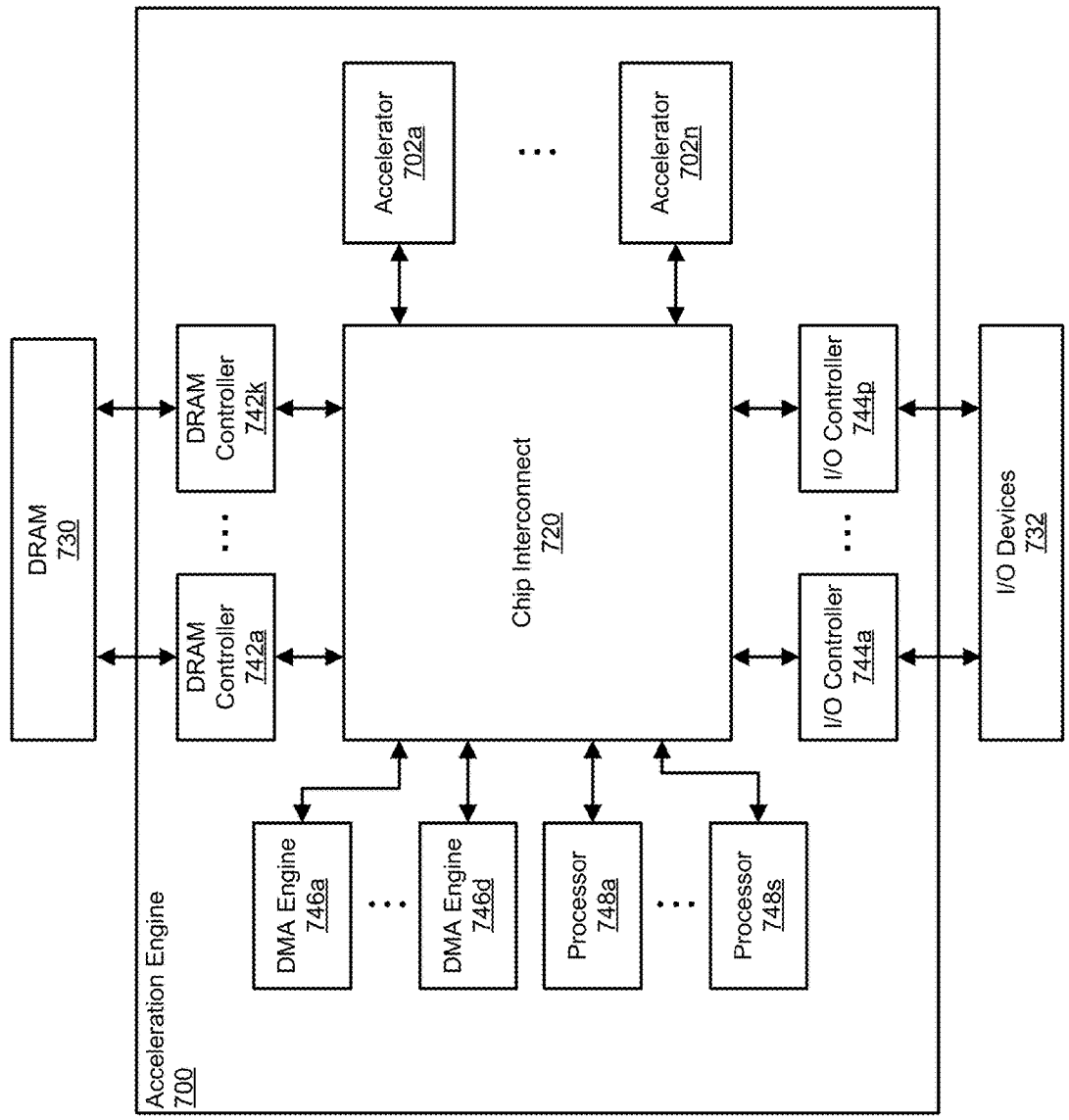
FIG. 7 includes a block diagram that illustrates an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the accelerators is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
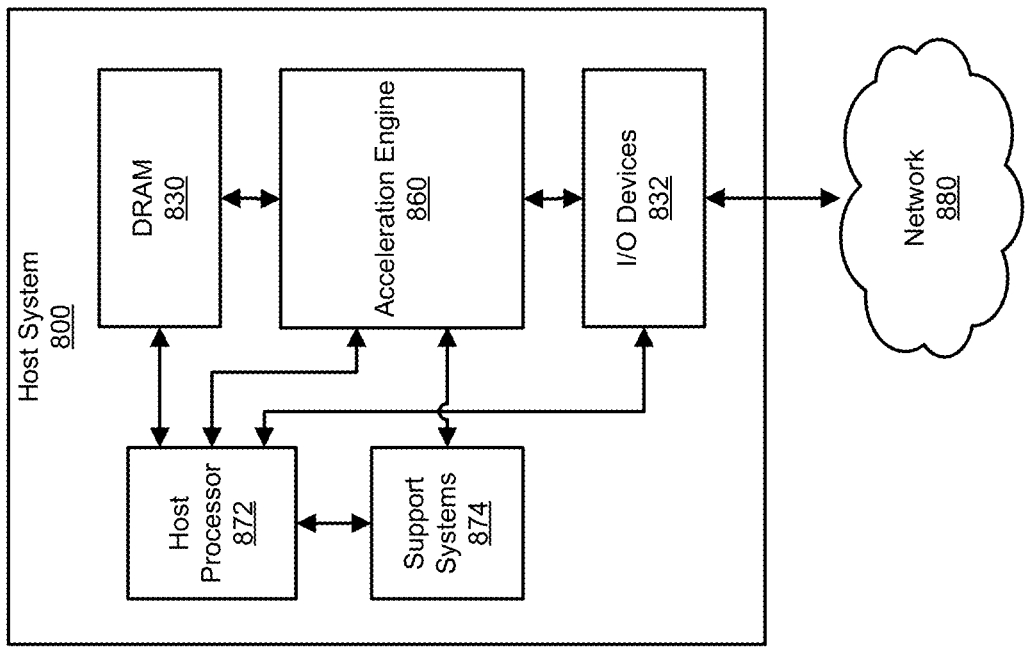
FIG. 8 includes a block diagram that illustrates an example of a host system.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 9:
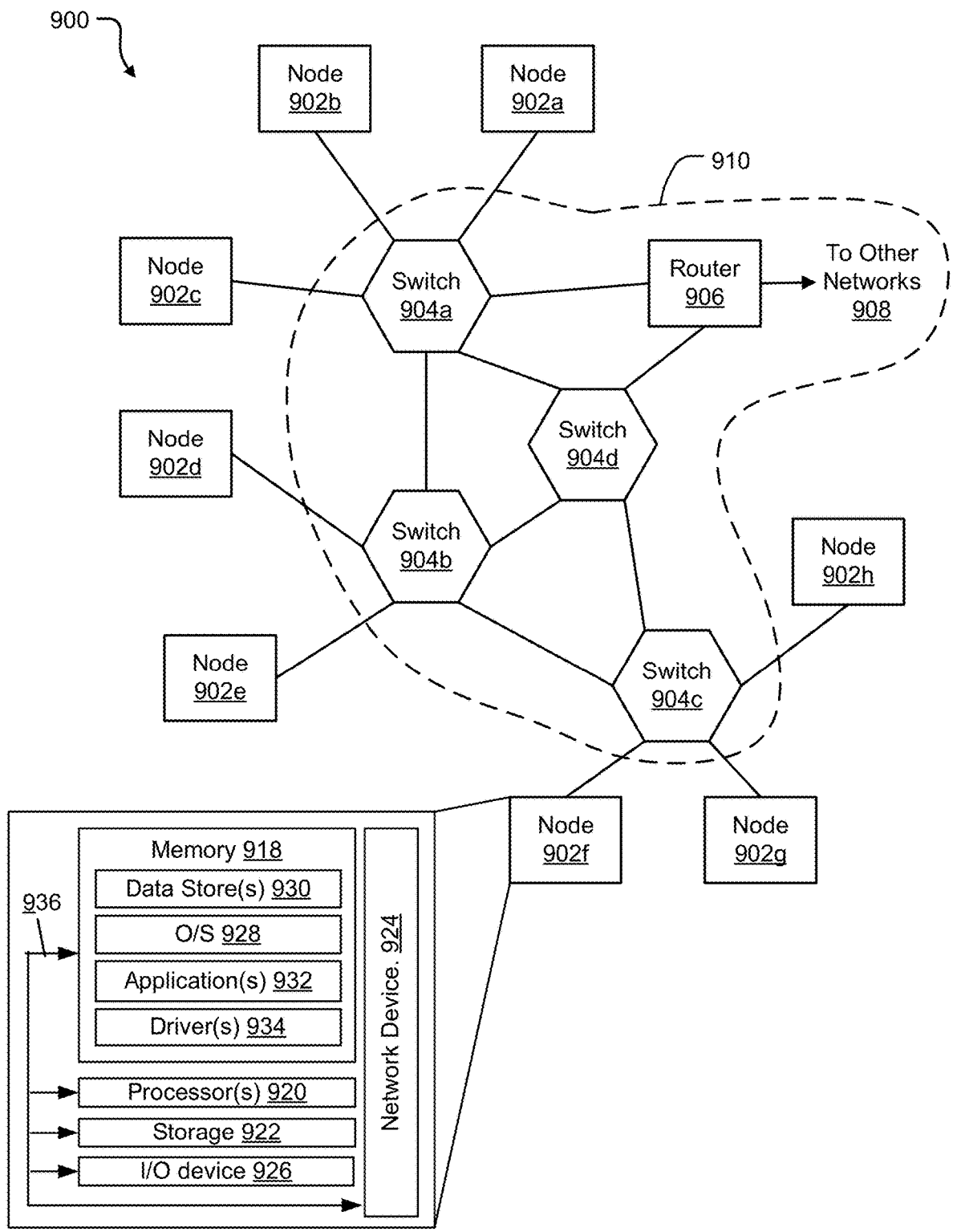
FIG. 9 includes a diagram of an example network.

FIG. 9 includes a diagram of an example network 900, which can include one or more host systems, such as the host system illustrated in FIG. 8. For example, the example network 900 of FIG. 9 includes multiple nodes 902a-902h, one or more of which can be a host system such as is illustrated in FIG. 8. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data was gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include anyone or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A place-and-route aware data pipelining method for designing an integrated circuit device, the method comprising:
   placing a master circuit block including a plurality of master partitions and a servant circuit block including a plurality of servant partitions on a layout for the integrated circuit device, wherein each master partition transfers data with a corresponding servant partition along a respective datapath of the integrated circuit device;
   for each datapath, calculating a physical distance from the master partition to the corresponding servant partition along the datapath;
   determining a number of clock cycles needed to transfer data along the datapath having a longest physical distance;
   determining a number of pipelining registers needed to satisfy the determined number of clock cycles for the datapath having the longest physical distance;
   adding the determined number of pipelining registers to each datapath between the master partitions and the corresponding servant partitions,
   wherein datapaths of master partitions further away from the servant circuit block have more pipelining registers added within the master circuit block than datapaths of master partitions that are closer to the servant circuit block.

2. The method of claim 1, wherein the datapaths of the master partitions further away from the servant circuit block have fewer pipelining registers added within the servant circuit block than the datapaths of the master partitions closer to the servant circuit block.

3. The method of claim 1, wherein a total number of master partitions in the master circuit block is equal to a total number of servant partitions in the servant circuit block.

4. The method of claim 1, wherein the master circuit block is an execution engine, and the servant circuit block is a data buffer.

5. A method, comprising:
   determining a first propagation delay associated with a longest datapath of a first set of datapaths between corresponding first master partitions of a first master circuit block in a design for an integrated circuit device and corresponding servant partitions of a servant circuit block in the design for the integrated circuit device;
   determining a first number of registers for addition into the longest datapath of the first set of datapaths to satisfy a clock timing parameter of the integrated circuit device; and
   adding the determined first number of registers to each datapath of the first set of datapaths,
   wherein the first set of datapaths include a first datapath and a second datapath, the first datapath having a different number of registers added within the first master circuit block than the second datapath.

6. The method of claim 5, wherein the first and second datapaths use a same number of clock cycles to transfer data between the first master circuit block and the servant circuit block.

7. The method of claim 5, wherein the integrated circuit device includes a second master circuit block having second master partitions that transfer data with corresponding servant partitions of the servant circuit block.

8. The method of claim 7, further comprising:
   determining a second propagation delay associated with a longest datapath of a second set of datapaths between corresponding second master partitions of the second master circuit block and the corresponding servant partitions of the servant circuit block;
   determining a second number of registers for addition into the longest datapath of the second set of datapaths to satisfy the clock timing parameter of the integrated circuit device; and
   adding the determined second number of registers to each datapath of the second set of datapaths.

9. The method of claim 8, wherein the second set of datapaths include a third datapath and a fourth datapath, the third datapath having a different number of registers added within the second master circuit block than the fourth datapath.

10. The method of claim 8, wherein adding the determined first number of registers for the first set of datapaths is performed independently from adding the determined second number of registers for the second set of datapaths.

11. The method of claim 10, wherein each servant partition comprises arbitration logic configured to arbitrate access to the servant partition from the first master circuit block and the second master circuit block.

12. The method of claim 5, further comprising fabricating the integrated circuit device.

13. The method of claim 5, further comprising determining the first master partitions and the servant partitions.

14. A non-transitory computer readable medium having stored therein instructions that, when executed by one or more processors cause the one or more processors to execute a place-and-route method, the place-and-route method performing operations including:
   determining a first propagation delay associated with a longest datapath of a first set of datapaths between corresponding first master partitions of a first master circuit block in a design for an integrated circuit device and corresponding servant partitions of a servant circuit block in the design for the integrated circuit device;

determining a first number of registers for addition into the longest datapath of the first set of datapaths to satisfy a clock timing parameter of the integrated circuit device; and adding the determined first number of registers to each datapath of the first set of datapaths, wherein the first set of datapaths include a first datapath and a second datapath, the first datapath having a different number of registers added within the first master circuit block than the second datapath.

15. The non-transitory computer readable medium as defined in claim 14, further comprising instruction for performing operations including:

determining a second propagation delay associated with a longest datapath of a second set of datapaths between corresponding second master partitions of a second master circuit block and the corresponding servant partitions of the servant circuit block;

determining a second number of registers for addition into the longest datapath of the second set of datapaths to satisfy the clock timing parameter of the integrated circuit device; and adding the determined second number of registers to each datapath of the second set of datapaths.

16. The non-transitory computer readable medium as defined in claim 15, wherein:

the second set of datapaths include a third datapath and a fourth datapath, the third datapath having a different number of registers added within the second master circuit block than the fourth datapath.

17. The non-transitory computer readable medium as defined in claim 16, further comprising instruction for performing operations including:

adding the determined first number of registers for the first set of datapaths independently from adding the determined second number of registers for the second set of datapaths.

18. The non-transitory computer readable medium as defined in claim 15, wherein each servant partition comprises arbitration logic configured to arbitrate access to the servant partition from the first master circuit block and the second master circuit block.

19. The method of claim 14, wherein the first master circuit block is an execution engine circuit and the servant circuit block is a storage buffer circuit.

20. An integrated circuit device produced by a process comprising the steps of:

determining a propagation delay associated with a longest datapath of a set of datapaths between corresponding master partitions of a master circuit block in a design of the integrated circuit device and corresponding servant partitions of a servant circuit block in the design of the integrated circuit device;

determining a number of registers for addition into the longest datapath of the set of datapaths to satisfy a clock timing parameter of the integrated circuit device; and adding the determined number of registers to each datapath of the set of datapaths, wherein the set of datapaths include a first datapath and a second datapath, the first datapath having a different number of registers added within the master circuit block than the second datapath; and fabricating the integrated circuit device.

* * * * *